Figure 1:
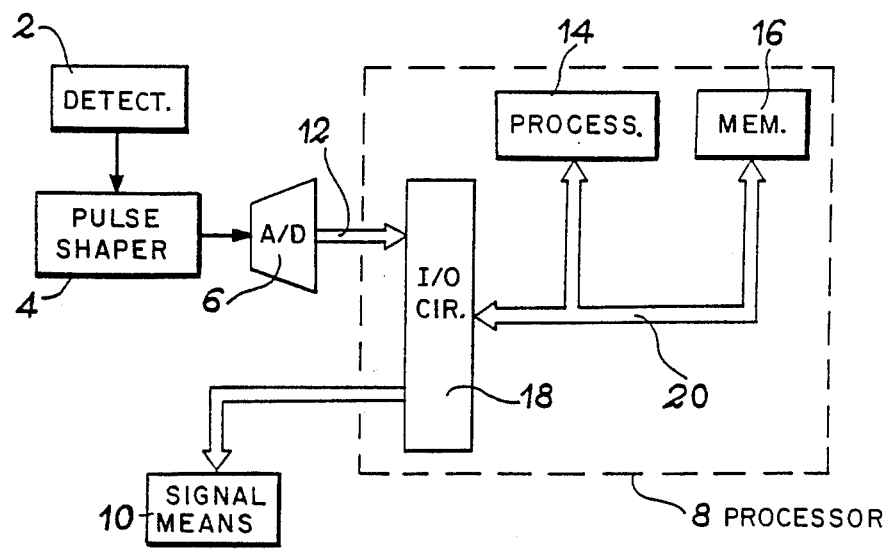

United States Patent [19]

Rambaut

[11] Patent Number: 4,942,546
[45] Date of Patent: Jul. 17, 1990

[54] SYSTEM FOR THE SUPPRESSION OF NOISE AND ITS VARIATIONS FOR THE DETECTION OF A PURE SIGNAL IN A MEASURED NOISY DISCRETE SIGNAL

[75] Inventor: Michel Rambaut, Bures-sur-Yvette, France

[73] Assignee: Commissariat a l'Energie Atomique, Paris, France

[21] Appl. No.: 246,415

[22] Filed: Sep. 19, 1988

[30] Foreign Application Priority Data

Sep. 18, 1987 [FR] France ................... 87 12970

[51] Int. Cl.$^5$ ............ H04B 15/00; G06F 15/20
[52] U.S. Cl. ............... 364/574; 364/571.01; 381/94
[58] Field of Search .......... 364/571.01, 574; 358/167; 381/94

[56] References Cited

U.S. PATENT DOCUMENTS

| 4,194,183 | 3/1980 | Neuner et al. | 364/574 |
|---|---|---|---|
| 4,530,076 | 7/1985 | Dwyer | 364/574 |
| 4,587,620 | 5/1986 | Niimi et al. | 364/574 |
| 4,635,217 | 1/1987 | O'Connor et al. | 364/574 |
| 4,684,989 | 8/1987 | Roeder et al. | 364/574 |
| 4,782,546 | 11/1988 | Poussier et al. | 364/574 |

FOREIGN PATENT DOCUMENTS 0202980 11/1986 European Pat. Off. .
0200596 12/1986 European Pat. Off. .

OTHER PUBLICATIONS

Nuclear Instrument & Method in Physics Research A248, Nucleonics 24, Aug. 1966.

Primary Examiner—Parshotam S. Lall
Assistant Examiner—Brian M. Mattson
Attorney, Agent, or Firm—Nutter, McClennen & Fish

[57] ABSTRACT

A system applicable to the detection of particle radiation for the suppression of noise and its variations for the detection of a pure signal in a measured noisy discrete signal detects events appearing in a predetermined energy window. It carries out a count $N_2$ for a time $\Delta T_s$ and a count $N_3$ for a time $\Delta T_b$, in which $\Delta T_b = q.\Delta T_s$ and q is a positive number, during which no event corresponding to the expected pure signal is present. It then evaluates the information supplied by counts $N_2$, $N_3$ for the chosen value of the coefficient q, or the associated false detection probability, by comparison with at least one information threshold $I_m$, each threshold being associated with a predetermined false detection level. Comparison takes place indirectly as a function of the probability and uses tabulated values.

11 Claims, 2 Drawing Sheets

SYSTEM FOR THE SUPPRESSION OF NOISE AND ITS VARIATIONS FOR THE DETECTION OF A PURE SIGNAL IN A MEASURED NOISY DISCRETE SIGNAL

The present invention relates to a system for the suppression of noise and its variations for the detection of a pure signal in a measured noisy discrete signal. This system evaluates the information supplied by the measured signal. This information leads to a probability of false detection, i.e. a probability of detecting a pure signal where it does not exist. The information can be compared with a threshold if it is only wished to detect the presence or absence of a pure signal, the threshold corresponding to a predetermined false detection level. The information can also be evaluated if it is wished to know the degree of certainty of the exsistence of a pure signal.

The invention relates to the detection of discrete signals, i.e. signals produced by discontinuous events. The invention particularly applies to the detection of particle radiation, such as neutron or gamma rays.

The detection of a pure signal in a measured noisy signal presupposes that is it possible to eliminate the noise in the measured signal. There are two possible cases, namely the mean noise level is constant and the mean noise level fluctuates. The invention relates to a detection system when the mean or average noise level fluctuates. As the mean constant noise level is only a special case of the mean fluctuating noise level, the inventive system can, a fortiori, be used for detection when the mean noise level is constant.

The detection of a particular, e.g. nuclear particle, radiation takes place in the presence of a corpuscular noise having several different causes. In the case of nuclear radiation, part of the noise is due to cosmic radiation, and the other part is due to the natural radioactivity of the ground and rocks. There is also a noise due to the detector used. Cosmic radiation can vary over a period of time, and corpuscular noise due to the rocks and the ground is essentially variable, as a function of the place where the measurement takes place. A particular radiation can consequently only be detected if the noise is known or if an adequate estimate exists.

The information is stored for a limited period of time $\Delta T$. This information storage takes place in a discrete manner, i.e. when a particle is detected, the content of a memory is increased by one unit. In general, one or more parameters define the detected nuclear event. In the case where said event is only dependent on a single parameter, the latter can be the energy, and this is the typical case of detecting gamma radiation with the aid of an intrinsic germanium or a NaI scintillator associated with a photomultiplier. This single parameter can also be time, e.g. on measuring the transit time of a particle. The detection condition can also be a complex logic function dependent on the state of several detectors during a short time interval, normally a few dozen nanoseconds, particularly in the case of the detection of particles in a chamber with wires.

The difficulty of detecting a discrete noisy signal is that the background noise has an essentially variable level as a function of time and the place where detection occurs.

In FR-A No. 2579767, the Applicant has described a system for the detection of a pure signal in a measured noisy discrete signal. This system makes use of a first energy window, called the signal channel or path, corresponding to the energy of the events to be detected (particular corpuscular radiation or the like) and a second energy window, called the reference channel or path for evaluating the background noise.

During equal times $\Delta T$, the number $N_2$ of events detected in the signal path and the number $N_3$ of events detected in the reference path are counted. The $N_2$ events detected in the signal path comprise $N_1$ events due to the corpuscular radiation to be detected and events due to the background noise.

The detection criteria for a pure signal in the signal path, i.e. $N_1 > O$, is defined by the inequality $N_2 > N_3/\lambda$, in which $\lambda$ is the ratio of the mean noise levels $M_3$ and $M_2$, respectively, in the reference path and in the signal path.

When the detection criterion is satisfied, information I exists regarding the existence of a pure signal in the measured signal and the greater the difference $N_2 - N_3/\lambda$, the greater the information. The information I can be quantified, particularly according to the expression $I = -\log(PF/(1-PF))$ in which PF is the false detection probability, i.e. the probability of detecting an event due to the noise and which is attributed to the particular corpusular radiation.

The Applicant has found that the system described in FR-A No. 2579767 could not be effectively used under certain conditions. In particular, the detection is falsified if a radiation source is superimposed on the noise in the reference channel because the background noise is then incorrectly evaluated.

Another limitation appears in the case of the detection of gamma radiation for measuring the radioactivity of a particular material. Thus, the detector is often constituted by a NaI crystal, in which the poor energy resolution can in certain cases bring about a partial overlap of the signal channel and the reference channel, whereas they are theoretically separate.

The invention aims at obviating the limitations due to the system described in FR-A No. 2579767.

This aim is achieved by the use of a system comprising a single channel in which are successively measured the background noise and the complete signal (pure signal and background noise).

More specifically, the invention relates to a system for suppressing noise and its variations for the detection of a pure signal in a measured discrete noisy signal incorporating in series a detector for converting a received radiation into electrical pulses, a shaping means, an analog-digital converter, a processing means incorporating a processor, at least one memory and an input-output circuit.

In this system, the processor measures a counting rate $N_2$ in a predetermined energy window for a time $\Delta T_S$, measures a counting rate $N_3$ in the same energy window for another time $\Delta T_b$ equal to $q.\Delta T_S$, in which q is a positive real number, during which no event due to the expected pure signal occurs, compares the information I, corresponding to the false detection probability associated with counts $N_2$, $N_3$ and to the coefficient q with at least one threshold $I_m$, each threshold $I_m$ corresponding to a predetermined false detection rate and controls the signalling means as a function of the value of information I with respect to the thresholds $I_m$.

This device can be effectively used when the count times are small compared with the variation time constant of the background noise at a given location, or if the counts take place at locations where the average background noise is identical.

Thus, the apparatus according to the invention is particularly suitable for the detection of gamma or neutron radiations by means of foot-moved portable detectors and for the detection of localized sources.

The value of the coefficient q expressing the ratio between the times $\Delta T_b$ and $\Delta T_s$ can be chosen in a random manner. However, a non-integral value leads to a complication of the processing, which is generally useless.

In the case of the detection of a radiation by successive counts of identical times $\Delta T_1, \ldots, \Delta T_i, \ldots$, it is possible to take the count made for the time $\Delta T_{i-1}$ as the noise count $N_3$ associated with the count $N_2$ made during the time $\Delta T_i$. In this case, $q=1$ is obtained. It is also possible to choose as the count $N_3$, the sum of the counts q preceding count $N_2$, in which it is wished to know whether it contains a pure signal. In this case, q is a random integer and in practice its value is a few units.

It should be noted that the inventive process consisting of taking for $N_3$ the sum of the q counts preceding count $N_2$ differs completely from the conventional process consisting of attempting to estimate the noise by taking the mean value of q counts preceding the count $N_2$ which is tested. In the conventional process, there is merely a comparison of the counts $N_2$ with the estimated noise, obtained by a sliding mean on q values, in which q is a few dozen units.

The information I supplied by the measurement can be exploited in two ways. It can be simply compared with the threshold $I_m$ in order to discriminate the presence or absence of a pure signal. It is also possible to measure the difference $I-I_m$ for evaluating the degree of certainty of the presence of a pure signal.

The comparison between the informations I and $I_m$ *can take place indirectly on the false detection probability and the false detection level associated with these informations. However, the information I is preferably used for exploitation, e.g. by displaying a signal representing the information as a function of the counts.*

According to the invention, the detection of a pure signal consists of comparing the information I supplied by the counts $N_2$ and $N_3$ for the value q with at least one predetermined information threshold $I_m$. Each threshold is defined by a false detection level TF.

According to a first preferred variant of the inventive system, the comparisons between the information I and each threshold $I_m$ are replaced by comparisons between the false detection probability PF, associated with counts $N_2$ and $N_3$ for the value q, and the false detection levels TF associated with the thresholds $I_m$. Preferably the information I is defined by the relation $I = -\log(PF/1-PF))$ and in the same way $I_m$ is defined by $I_m = -\log(TF/1-TF))$.

According to a second preferred variant of the inventive system, in the case of knowing the relationship between the mean pure signal level $M_1$, the mean noise level $M_2$ for the count time $T_s$, the mean noise level $M_3$ for the count time $T_b$ and the false detection level TF, the mean pure signal level $M_1$ is compared with the level estimated by $N_2 - N_3/q$.

This comparison produces the same result as the direct comparison between the false detection probability PF and the false detection level TF, but often has the advantage of being easier to carry out in practice.

In the variant which has been described, a relation of type $f(TF, M_1, M_2, M_3) = 0$ is assumed to be known. Bearing in mind $q = M_3/M_2$, this amounts to knowing a relation of type $q(TF, M_1, M_2, q) = 0$. For the measured counts $N_2$ and $N_3$, the relation becomes $g(PF, N_2 - N_3/q, N_3/q, q) = 0$.

The practical use of the relation $g=0$ for deciding whether a pure signal is present can in certain cases lead to long and complicated calculations. The duration of the direct calculation of the false detection probability can in particular be a function of the value of the measured counts. The duration of this calculation can in particular be incompatible with a real time detection if the duration of each count is, e.g. one second.

According to a preferred feature of the detection system according to the invention, the function g is tabulated. This makes it possible to rapidly calculate the mean pure signal level $M_1$ for comparing it with $N_2-31$ $N_3/q$, or the false detection probability PF for comparing it with the false detection level TF. The tabulation of function g has the major advantage that the duration of the calculation of the mean pure signal level $M_1$ or the false detection probability PF is independent of the measured count values $N_2$ and $N_3$.

The function g can be tabulated for several different values of the false detection level TF. The comparison of the estimated value of the signal $N_2-N_3/q$ with the values of $M_1$ corresponding to each false detection level TF makes it possible to measure the information supplied by the counts.

In the case where the function g is tabulated for a single value of the false detection level TF, the comparison between $N_2-N_3/q$ and $M_1$ positions the information I with respect to the threshold $I_m$, but does not determine the value of information I.

The storage in the form of tables of the function g is particularly easy in the case where the linear relationships can be revealed between the variables of the function or between the simple functions of the variables.

The particle radiations, such as neutron or gamma rays, are radiations for which the number of detected particles during a time interval $\Delta T$ is a random variable, whose probability density is that of Poisson's law.

It is found that in this case a substantially linear relationship exists between $\log(N_1)$ and $\log(N_2)$, in which $N_1 = N_2 - N_3/q$, for a fixed value of q and for a fixed false detection level TF.

Another tabulation possibility for function q, which can be realized when there is no linear relationship between the variables of function q consists of creating, for each value of the false detection level TF, a table having a number of pairs $(N_2, C(N_2))$, in which $C(N_2)$ is the closest integer to the mean noise level $M_2$ in count $N_2$ which produces a false detection probability PF equal to the false detection level TF.

Thus, for each measured count $N_2$, the value $C((N_2)$ read in the table is compared with the estimate $N_3/q$ of the mean noise level in count $N_2$ and a decision is made as to whether a pure signal is present with a false detection probability below TF, if $C(N_2) \geq N_3/q$. According to a variant, it is possible to choose the mean noise level $M_3$ equal to $q.M_2$ for $C(N_2)$. The $C(N_2)$ is compared with $N_3$ for each count.

The invention is described in greater detail hereinafter relative to non-limitative embodiments and the attached drawings, wherein show:

FIG. 1 Diagrammatically, the system according to the invention.

Figure 2:
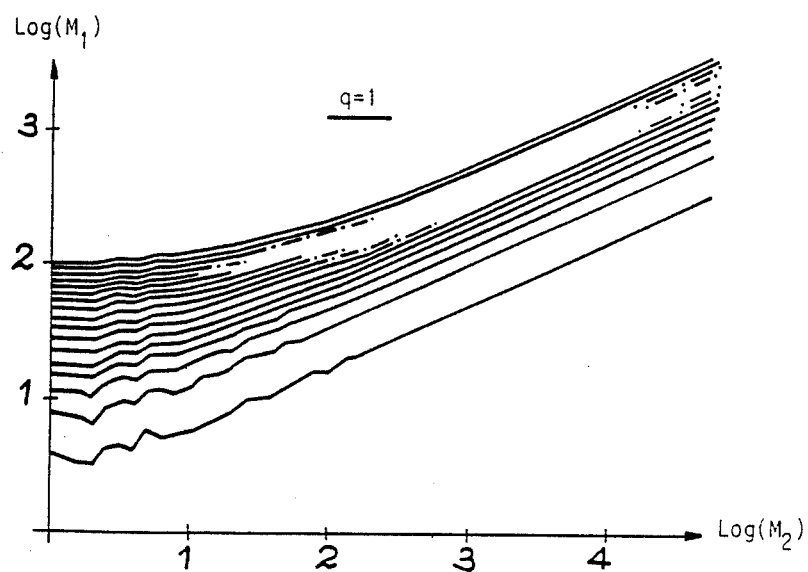

FIG. 2 Graphically for $q=1$, the relationship between $\log(M_1)$ and $\log(M_2)$ for different values of the false detection level TF, in the case where the probability density of the number of detected particles is that of Poisson's law.

Figure 3:
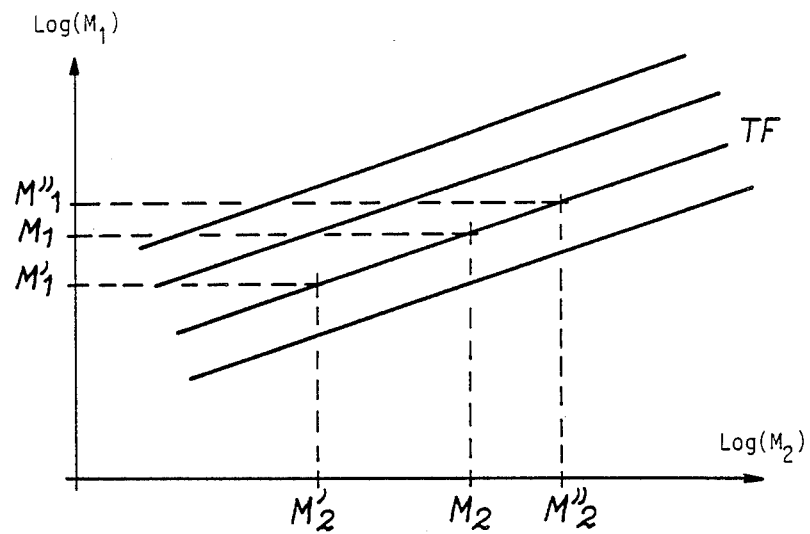

FIG. 3 Graphically the determination of Log($M_1$) as a function of the count $N_2$ by means of stored linear relationships.

Figure 4:
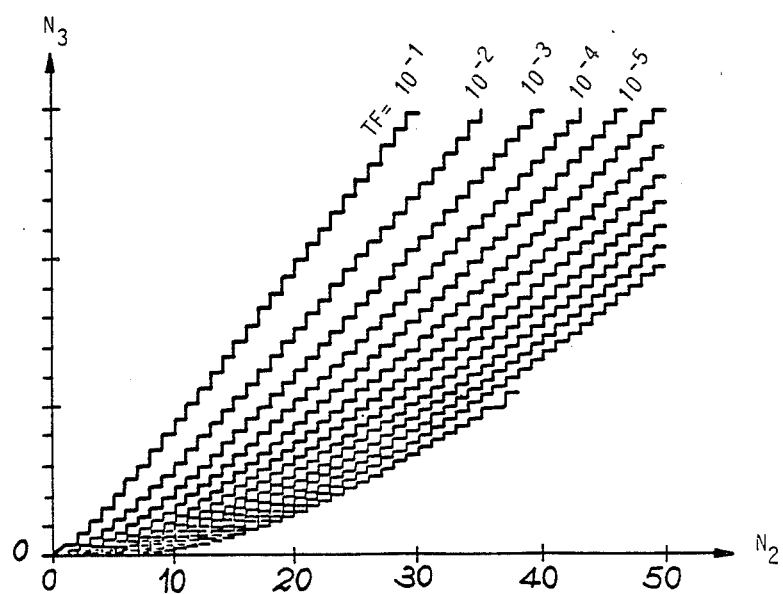

FIG. 4 A graph illustrating, for different values of the predetermined false detection level TF, the presence or absence of a pure signal in the measured noisy signal as a function of count $N_2$ and count $N_3$.

FIG. 5 A a flowchart of the program executed by the system's processor.

The invention is applicable to all discrete radiations, such as particle radiations and it more specifically relates to the analysis of the signals supplied by a detector for deciding, with a false detection probability below a predetermined false detection rate, whether the analyzed signal contains a pure signal due to the presence of a particular source or is the signal is solely constituted by noise. For example, the inventive process is applicable to the detection of gamma rays and neutron rays.

The system shown in FIG. 1 comprises a detector 2, a shaping means 4, an analog-digital converter 6, a processing means 8 and a signalling means 10.

Detector 2 is dependent on the radiation to be detected. For the detection of gamma rays, the detector can be an intrinsic germanium or a NaI scintillator associated with a photomultiplier. For the detection of neutrons, the detector is a He3 counter.

Detector 2 supplies a voltage pulse for each detected event. This pulse is received by the shaping means 4. It can in particular comprise in series an amplifier, a shaping circuit and a discriminator.

The analog-digital converter 6 is located downstream from the shaping means 4. It converts the amplitude of the pulse received into a binary signal, e.g. on 8 bits in the case of a NaI scintillator, or 12 bits in the case of an intrinsic germanium. This binary signal is transmitted to the processing means 8 by a channel 12.

The processing means 8 comprises a processor 14, at least one memory 16 and an input-output circuit 18. These components are connected by a channel 20 incorporating address lines, data lines and control lines.

The signalling means 10 is controlled by the processor 14 across the input-output circuit 18 and a channel 22. It can, in particular, comprise visual and sound alert or alarm means, which are triggered when a pure signal is detected, in the case where the information I is compared with a single threshold $I_m$. They supply the value of information I, if the latter is estimated by comparison with several different thresholds.

The system functions as follows. Counts $N_2$ and $N_3$ are performed for time $\Delta T_S$ and $\Delta T_b$, which are independent, for counting the number of pulses received by the detector in a predetermined energy window corresponding to the energy of the signal to be detected.

Count $N_3$ takes place for a time $\Delta T_b$ during which it can be assumed that there is no signal, count $N_3$ thus solely representing the background noise in the predetermined energy window. Count $N_3$, which serves as a reference, can take place either before or after count $N_2$.

Times $\Delta T_b$ and $\Delta T_S$ are not necessarily equal. In certain cases, it can be advantageous to choose a ratio $q = \Delta T_b / \Delta T_s$ differing from 1. For example, when the system is used during an experiment in connection with a particle accelerator, it is important, bearing in mind the cost of such experiments, to optimize the ratio q in order to obtain the desired information quantity in a minimum time.

However, in the case of a sequential detection where the counts take place in a repetitive manner for consecutive $\Delta T_1, \Delta T_2, \ldots, \Delta T_i$, no optimization problem occurs. The simplest solution then consists of choosing for the count $N_3$, associated with a count $N_2$ performed for time $\Delta T_i$, the sum of q counts performed for the time $\Delta T_{i-q}, \Delta T_{i-q+1}, \ldots, \Delta T_{i-1}$. The ratio q is then an integer. It is in practice advantageous to choose a value between 1 and 5.

A possible variant, when q=1, consists of taking as the reference $N_3$ the count made for time $\Delta T_{i-1}$ for all the counts $N_2$ made for times $\Delta T_i$, $\Delta T_{i+1}$, $\Delta T_{i+2}$, etc. while the information supplied by counts $N_2$ and the count $N_3$ exceeds a predetermined threshold and then taking the penultimate count $N_2$ as the reference count $N_3$ when the information drops below the predetermined threshold.

For each count pair ($N_2$, $N_3$), the system compares the false detection probability PF associated with these counts with at least one false detection level TF, or a function of the false detection probability with a function of the false detection level of predetermined type, the function possibly being the information I.

A description will now be given in exemplified manner of the operation of the inventive system for the detection of particle radiation. The probability density of the number of detected particles is that of Poisson's law.

The probability that a radiation exists, no matter whether $N_2$ does or does not contain an event due to it, is for $M_3$ constant:

$$P_1 = e^{-M_2} \cdot \sum_{J=0}^{J=N_2} \frac{M_2^J}{J!}$$

Moreover, the probability that $M_3$ is between $M_3$ and $M_3 + dM_3$ is:

$$P_2 = \frac{e^{-M_3} \cdot \frac{(M_3)^{N_3}}{N_3!} \cdot dM_3}{\int_0^\infty e^{-M_3} \cdot \frac{(M_3)^{N_3}}{N_3!} \cdot dM_3}$$

The probability of the absence of a pure radiation, or the probability of false detection is then:

$$PF = \int_0^\infty \{q \cdot N_2\} P_1 \cdot P_2$$

in which {} signifies "integral part of", i.e. by using $qM_2 = M_3$, $$PF = \sum_{J=N_2+1}^{\infty} \left( \frac{q^{N_3+1}}{(1+q)^{J+N_3+1}} \cdot \frac{(J+N_3)!}{J! \cdot N_3!} \cdot Y \right)$$

with $$Y = e^{-(1+q) \cdot N_2} \cdot \sum_{K=0}^{K=J+N_3} \frac{((1+q) \cdot N_2)^K}{K!}$$

The false detection level TF is obtained by replacing in the expression of PF:

$$N_2 \text{ by } \{M_1\} + \{M_2\}$$

$$N_3 \text{ by } \{M_3\}$$

where {} signifies "integral part of". Bearing in mind $M_3/M_2$, the relation is of form $g(TF, M_1, M_2, q)=0$.

As has been stated hereinbefore, when the probability density of the detected number of events follows Poisson's law, it is possible to reveal substantially linear relationships between simple functions of variables TF, $M_1$, $M_2$ and q. This makes it possible to store in the form of tables the function g and to determine without calculation the mean signal level $M_1$ corresponding to a predetermined false detection level TF, for an estimated noise level $M_2$ and a fixed ratio q and to compare the mean signal level $M_1$ with the estimated level equal to $N_2-N_3/q$.

FIG. 2 is a graph showing the substantially linear relationship between $Log(M_1)$ and $Log(M_2)$ for the particular value $q=1$. This graph consists of a number of lines, each corresponding to one value of TF.

The storage of all these lines is not necessary. It is only necessary to store the lines corresponding to $TF=10^{-3}, 10^{-4}, 10^{-5}$ and $10^{-6}$. For each of the lines to be stored, at least two pairs of points must be stored. This number could be increased if it is considered that the linearity is inadequate.

For detection according to the invention, a table is formed consisting of $k_1.k_2$ pairs of points ($Log(M_1)$, $Log(M_2)$), in which $k_1$ is the number of stored TF values and $k_2$ the number of points stored per line.

The detection of a pure signal then takes place in the following way. Counts $N_2$ and $N_3$ are carried out for time $\Delta T_s$ and $\Delta T_b$, in which $\Delta T_b = q.\Delta T_s$, count $N_3$ taking place at a moment when it is assumed that there is no pure signal.

This is followed by an estimation of the mean noise level $M_2$ for time $\Delta T_s$ by the ratio $N_3/q$ and from this is deduced the mean pure signal level $M_1$ for time $\Delta T_s$ using the table.

For the chosen value TF, the mean pure signal level $M_1$ is obtained, in the manner shown in FIG. 3, by interpolating pairs ($Log(M'_1)$, $Log(M'_2)$) and $Log(M''_1)$, $Log(M''_2)$), and as a function of the mean noise level $M_2$. The interpolation can be replaced by an extrapolation if $Log(M_2)$ is not between $Log(M'_2)$ and $Log(M''_2)$.

It is then only necessary to compare the value $M_1$ with its estimate equal to $N_2-N_3/q$. If $M_1$ exceeds $N_2-N_3/q$, it is considered that the count $N_2$ only contains events due to noise. In the opposite case, it is considered that a pure signal has been detected.

The comparison between the value $M_1$ of the mean signal level given by the table and the estimated value $N_2-N_3/q$ is identical to the comparison between the false detection level TF and the false detection probability PF, or between the information threshold $I_m$ and the information I supplied by the counts.

The comparison between the estimated value $N_2-N_3/q$ and a single value of $M_1$ defined by a predetermined false detection TF effects a detection by threshold, i.e. a pure signal is present if the threshold is cleared, and a pure signal is absent if it is not cleared.

As stated hereinbefore, the information can be evaluated more quantitatively. This information evaluation utilizes the sequence of operations which has just been described, whereby they are repeated for several values of TF, e.g. $10^{-3}, 10^{-4}, 10^{-5}$ and $10^{-6}$. Thus, the system determines several values of the mean signal level $M_1$, each associated with a false detection level and therefore an information level.

The information I supplied by the counts is between informations I' and I'' corresponding to the mean noise levels $M''_1$ and $M''_1$ defined by $M'_1 \geqq N_2$ and $(N_3/q) \leqq M''_1$.

The information is defined according to the invention by the relation $I = -Log(PF/(1-PF))$. The false detection probability is generally below $10^{-3}$, so that in practice this relation is $I = -LogPF$.

Thus, in general information I only has a value of a few units for a logarithm base equal to 10. The graphical representation of the information I as a function of the count number, i.e. as a function of time, then constitutes a particularly clear and representative display for an operator.

The detection process described relative to FIGS. 2 and 3 can only be realized if linear relationships exist between simple functions of the variables TF, $M_1$, $M_2$ and q. In the opposite case, the detection can take place in the following way.

First, for each chosen false detection level TF is created a table constituted by a group of pairs ($N_2$, $C(N_2)$), in which $C(N_2)$ is the closest integer to the mean noise level $M_2$ of count $N_2$ for which the false detection probability PF is equal to the false detection level TF. Then, for each measured counting pair ($N_2$, $N_3$), an estimation takes place of the mean noise level $M_2$ by the value $N_3/q$ and the estimate is compared with the value $C(N_2)$ read in the table corresponding to TF. If $C(N_2)$ exceeds $N_3q$, a pure signal is present in the count $N_2$. If $C(N_2)$ is below $N_3q$, the count $N_2$ only contains noise. According to a variant, $C(N_2)$ is taken for the value $qM_2$, i.e. $M_3$ instead of $M_2$. Then, $C(N_2)$ is compared with $N_3$ instead of $N_3/q$.

FIG. 4 shows a graph illustrating the tables formed for different values of TF. The detection according to the invention consists of comparing the position of the coordinate point ($N_2$, $N_3$) with the curve of the chosen predetermined false detection level TF. If this point is above the curve, count $N_2$ only contains noise, whereas in the opposite case, count $N_2$ contains a pure signal.

As in the process described with reference to FIGS. 2 and 3, the process described relative to FIG. 4 makes it possible to quantitatively evaluate the information I when several tables, each associated with a particular value of TF, are used.

I claim:

1. A system for detecting presence of a pure signal in a measured discrete noisy signal comprising in series connection a detector for converting radiation received into electrical pulses, shaping means for shaping the electrical pulses, an analog-to-digital converter, processing means and signalling means, said processing means including a processor, memory means and an input-output circuit connected to exchange data with the processor and memory means, said processor comprising:

means for measuring a pulse counting rate $N_2$ having a means noise level $M_3$ for a first time period $\Delta T_S$;

means for measuring a pulse counting rate $N_3$ having a means noise level $M_2$ for a second time period $\Delta T_b = q\Delta T_S$, where q is a positive real number during which said pure signal is not expected to occur;

means for calculating a false detection probability PF as a function of q and said counting rates $N_2$ and $N_3$;

means for calculating a false detection level TF as a function of said $M_2$, $M_3$ and q;

means for calculating an information I as a function of said false detection probability PF;

means for calculating an information threshold $I_m$ as a function of said false detection level TF; and means for comparing said information I with said information threshold $I_m$ to thereby determine that a pure signal has been detected in said measured signal, said processing means thereupon controlling said signalling means accordingly.

2. The system according to claim 1, wherein the measurements are performed sequentially and continuously for successive equal times and in that a same counting rate $N_3$ performed for the time $\Delta T^{i-1}$ is used for the counting rate $N_2$ performed for the times $\Delta T_i$, $\Delta T_{i+1}$, ..., while the pairs ($N_2$, $N_3$), in which $N_3$ is fixed, supply an information I above a predetermined threshold $I_m$.

3. The system according to claim 1, wherein the processor compares the information I with a single threshold $I_m$, a pure signal being detected if the threshold is cleared.

4. The system according to claim 1, wherein the processor estimates the information I by comparison with a plurality of thresholds $I_m$.

5. The system according to claim 1, wherein the processor compares the false detecting probability PF, associated with information I, with the false detection level TF, associated with each threshold $I_m$, the information I being defined by $I = -\text{Log}(PF/(1-PF))$ and each threshold $I_m$ by $I_m = -\text{Log}(TF/(1-TF))$.

6. The system according to claim 1, wherein a relation $g(TF, M_1, M_2, q) = 0$ is known, in which $M_1$ is a mean pure signal level and $M_2$ is the mean noise level and wherein the detection is carried out indirectly on the mean pure signal level, the processor comparing for at least one value of the false detection level TF, the value M, with an estimated pure means signal level $N_2 - N_3q$, in which $N_3/q$ is an estimate of $M_2$.

7. The system according to claim 6, wherein the relation $g(TF, M_1, M_2, q) = 0$ is stored in table form in said memory means.

8. The system according to claim 7 for the detection of a signal for which $\text{Log}(M_1)$ is a linear function of $\text{Log}(M_2)$, wherein the processor:

creates, prior to any measurement, a table incorporating for each value of TF taken from among a number of predetermined values, two pairs ($\text{Log}M_1$, $\text{Log}M_2$), calculates, following each measurement and for at least one value of TF, $\text{Log}(M_1)$ associated with an estimate $\text{Log}N_3/q$ of $\text{Log}(M_2)$, by interpolation values contained in the table, and compares an mean estimated crude signal level $N_2 - N_3/q$ with at least one calculated pure mean signal level $M_1$.

9. The system according to claim 7, wherein the processor:

creates, prior to any measurement, for each value of TF taken from among a group of predetermined values, a table including a sequence of pairs ($N_2$, $C(N_2)$), in which $C(N_2)$ is the closest integer to the mean noise level $M_2$ for the time $\Delta T_s$ of count $N_2$ which produces a false detection probability PF equal to the false detection level TF, said table being stored in the memory means, and after each measurement compares the value $C(N_2)$ of the table associated with the count $N_2$ with the count $N_3/q$, a pure signal being detected if $C(N_2)$ exceeds $N_3/q$.

10. The system according to claim 7, wherein the processor:

creates, prior to any measurement, for each value of TF taken from among a group of predetermined values, a table incorporating a sequence of pairs ($N_2$, $C(N_2)$), in which $C(N_2)$ is the integer closest to the mean noise level $M_3$ for the time $\Delta T_b$ of count $N_3$ producing a false detection probability PF equal to the false detection level TF, said table being stored in the memory means, and compares, following each measurement, the value $C(N_2)$ of the table, associated with count $N_2$, with count $N_3$, a pure signal being detected if $C(N_2)$ exceeds $N_3$.

11. The system according to claim 1, wherein the memory means contains tables for several values of TF, the processor calculating a mean pure signal level $M_1$ for several values of TF and evaluating a false detection probability associated with the counts $N_2$ and $N_3$ by surrounding it with two values of TF corresponding to two values of $M_1$ surrounding an estimate $N_2 - N_3/q$.

* * * * *